(12) United States Patent
Taniwaki

(10) Patent No.: US 8,457,650 B2
(45) Date of Patent: Jun. 4, 2013

(54) PORTABLE COMMUNICATION TERMINAL

(75) Inventor: Minako Taniwaki, Yokohama (JP)

(73) Assignee: Kyocera Corporation, Takedatobadono-cho, Fushimi-ku, Kyoto-shi, Kyoto (JP)

( * ) Notice: Subject to any disclaimer, the term of this patent is extended or adjusted under 35 U.S.C. 154(b) by 2101 days.

(21) Appl. No.: 10/778,719

(22) Filed: Feb. 12, 2004

(65) Prior Publication Data

US 2004/0162088 A1    Aug. 19, 2004

(30) Foreign Application Priority Data

Feb. 12, 2003    (JP) ................................. 2003-033597

(51) Int. Cl.
*H04W 24/00*    (2009.01)
(52) U.S. Cl.
USPC .................. 455/456.1; 455/404.2; 455/414.2; 455/457
(58) Field of Classification Search
USPC ...... 455/456.6, 457, 456.1; 340/573.1; 726/4, 726/21; 380/241
See application file for complete search history.

(56) References Cited

U.S. PATENT DOCUMENTS

| | | | | |
|---|---|---|---|---|
| 6,707,424 B1 * | 3/2004 | Snyder et al. | ............ | 342/357.14 |
| 6,842,896 B1 * | 1/2005 | Redding et al. | ............... | 717/172 |
| 6,999,777 B1 * | 2/2006 | Ganesh | ....................... | 455/456.1 |
| 7,130,630 B1 * | 10/2006 | Enzmann et al. | .......... | 455/456.1 |
| 2004/0203900 A1 * | 10/2004 | Cedervall et al. | .......... | 455/456.1 |

FOREIGN PATENT DOCUMENTS

| | | |
|---|---|---|
| CN | 1302166 | 7/2001 |
| CN | 1354614 | 6/2002 |
| JP | 11-112618 | 4/1999 |
| JP | 2000-078280 | 3/2000 |
| JP | 2001-059740 | 3/2001 |
| JP | 2001-268216 | 9/2001 |
| JP | 2002335551 | 11/2002 |
| JP | 2002-354121 | 12/2002 |
| JP | 2003-174519 | 6/2003 |

OTHER PUBLICATIONS

Japanese Office Action dated Jul. 3, 2007.
Japanese Office Action dated Jan. 23, 2007.

* cited by examiner

*Primary Examiner* — Lester Kincaid
*Assistant Examiner* — Isaak Jama
(74) *Attorney, Agent, or Firm* — Schulte Roth & Zabel; John C. Garces

(57) ABSTRACT

A portable telephone has a positional information system unit employed to use a positional information system function for acquiring positional information, and a communication unit for transmitting/receiving the positional information to/from another terminal. The portable telephone has an address book function capable of registering telephone numbers into a storage unit by an input operation; and a control unit which operates in a manner that when a telephone communication is received, in the case that a telephone number is not notified from a telephone of a caller, or a telephone number notified from a telephone of a caller does not correspond to a telephone number registered in the storage unit, even if a signal for requesting the positional information from the telephone of the caller is received during the telephone communication, the control unit does not send the positional information.

12 Claims, 9 Drawing Sheets

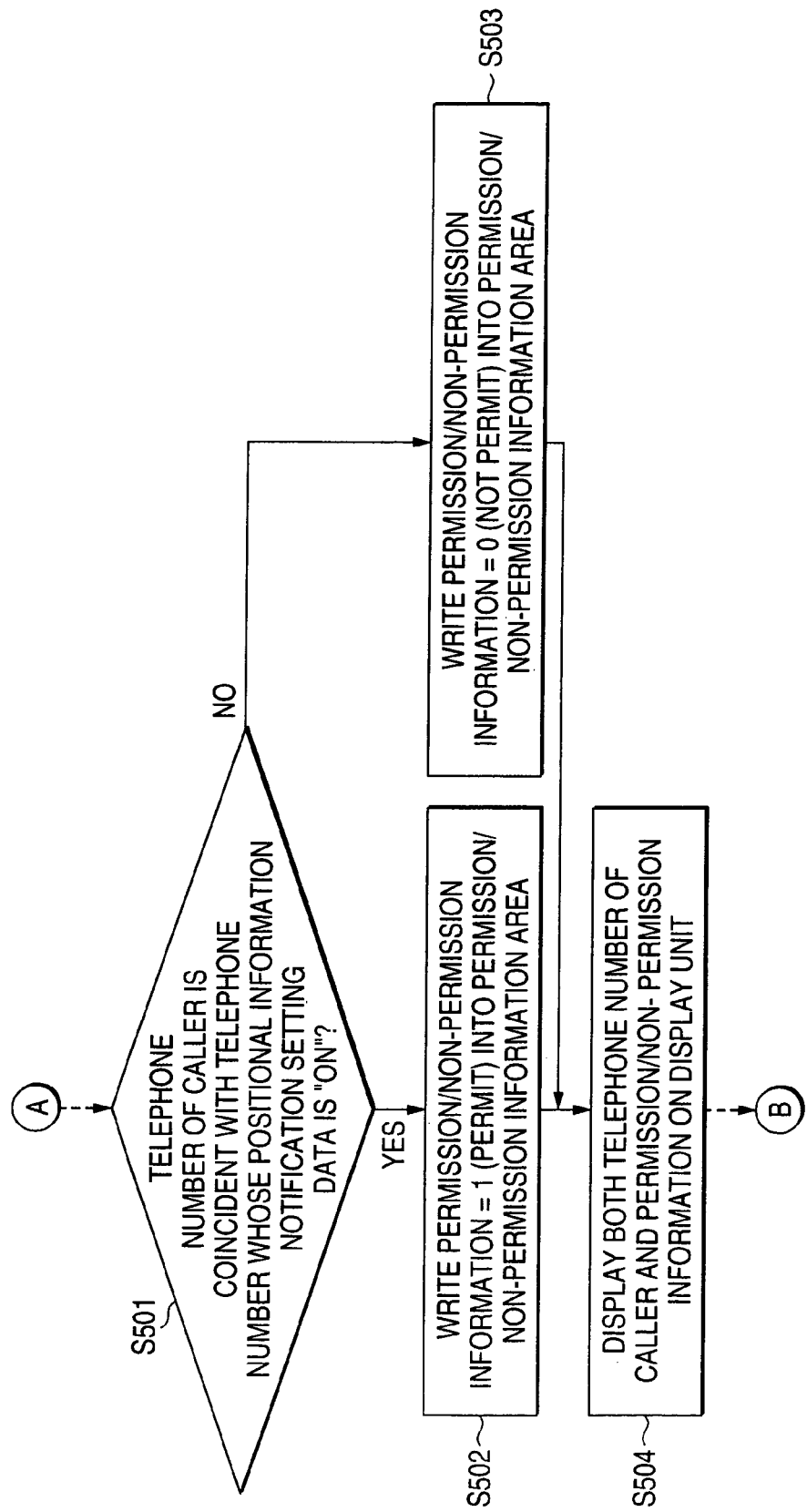

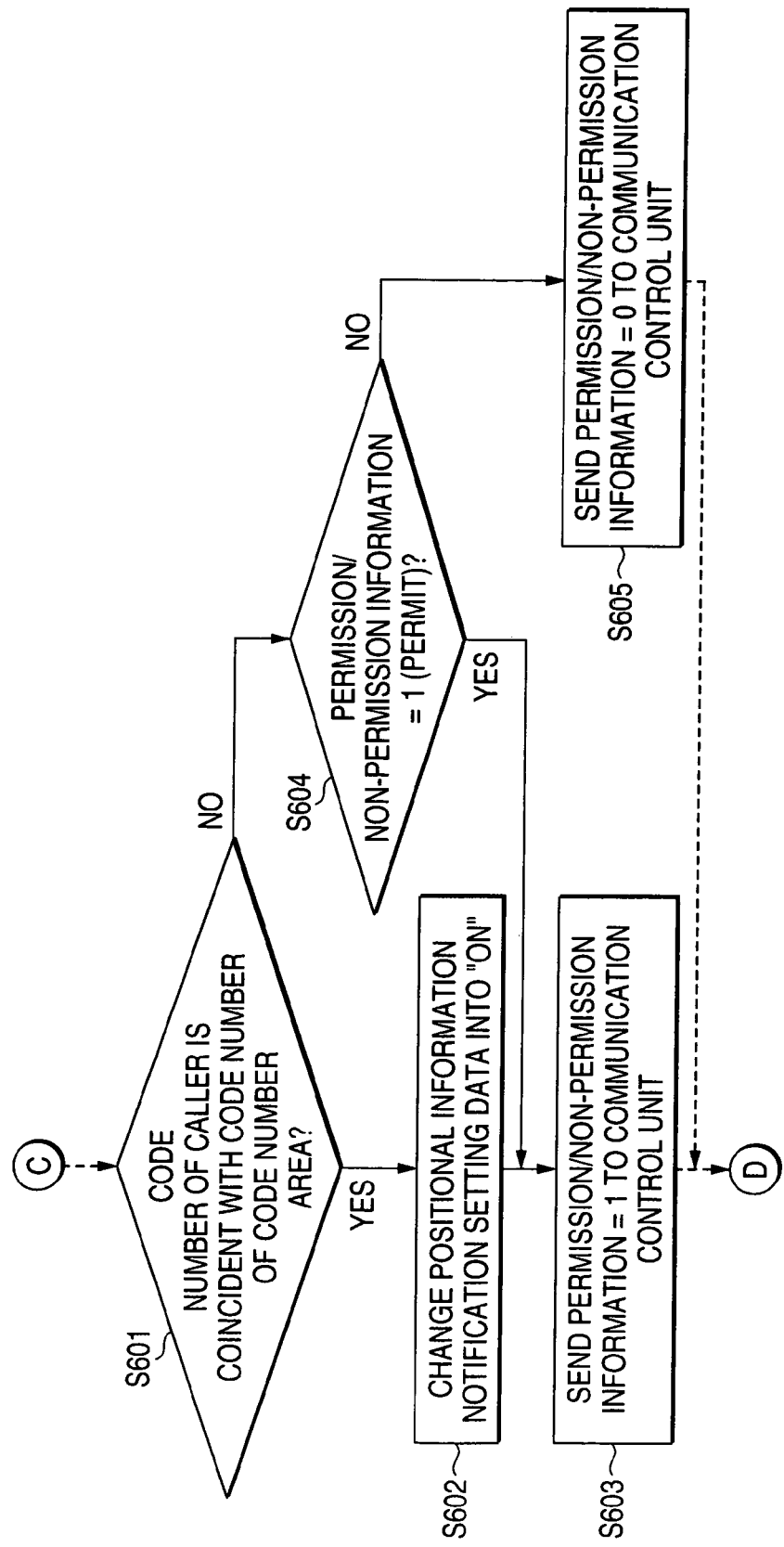

PORTABLE COMMUNICATION TERMINAL

BACKGROUND OF THE INVENTION

1. Field of the Invention

The present invention is related to a portable communication terminal such as a portable telephone which is capable of acquiring positional information by utilizing a positional information system function such as a GPS that can measure a position at the present time, and is also capable of transmitting/receiving the acquired positional information.

2. Description of the Related Art

A portable telephone which is capable of using a positional information system function has already been in actual use. As the positional information system, there is a system in which a present position of a portable telephone is identified on the basis of positions of a plurality of base stations capable of communicating this portable telephone. There is also a GPS (Global Positioning System) capable of positioning the position of a portable telephone based on arrival time differences of electromagnetic waves transmitted from a plurality of satellites.

Users of portable telephones can judge correct positions of the users by using these positional information system functions. Also, a position of a user on the transmission side can be identified even in a portable telephone on the reception side by using the following methods (see, for example, JP-A-2002-335551). That is, in one method, after a portable telephone of the user has acquired positional information, while this user is making a telephone communication with another portable telephone, the acquired positional information is transmitted as partial data of the telephone communication data. In another method, after the telephone communication ends, the positional information is transmitted.

In a case that this portable telephone is lost, this lost portable telephone may be found out in such a way that a telephone communication is made from another portable telephone so as to send positional information, and this sent positional information is used to find out the lost portable telephone.

JP-A-2002-335551 is referred as a related art.

However, the above portable telephone owns the following problem. That is, in a case that a telephone communication is received from a terminal of an ill-intentioned caller and a telephone communication is commenced for the caller's purpose between the portable telephone and the terminal, when the terminal of the ill-intentioned caller transmits to the portable telephone such a signal for requesting sending of positional information, the positional information is freely derived from this portable telephone. Thus, there is a risk that an invasion of a privacy of the user may occur.

SUMMARY OF THE INVENTION

An object of the present invention is to provide a portable telephone which is operable in such a manner that even when an ill-intentioned caller requests the portable telephone to send positional information, the portable telephone refuses the request and does not send the positional information.

A telephone communication of the present invention means that information is transmitted/received mutually between apparatuses, and also involves such a case that data is transmitted/received.

The invention provides a portable communication terminal having: a present position identifying unit for identifying a present position of said terminal; a communication unit for receiving a present position request signal which requests from said terminal a present position information representing said present position, and transmitting said present position information in reply thereto; and a control unit for judging whether or not another terminal meets a predetermined condition, and controlling said communication unit to transmit said present position information if said predetermined condition is not met when said communication unit receives said present position request signal which is transmitted from another terminal.

In accordance with a portable communication terminal of the invention, even when a telephone call made by an ill-intentioned caller is received and thus a telephone communication is commenced for the caller's purpose, privacy of the user can be firmly protected since the ill-intentioned caller cannot freely acquire the positional information from this portable telephone.

BRIEF DESCRIPTION OF THE DRAWINGS

FIG. 8 is a flow chart for describing an operation sequence of the main control unit 4 in the second and third embodiments of the present invention; and FIG. 9 is a flow chart for describing an operation sequence of the main control unit 4 in the third embodiment of the present invention.

DETAILED DESCRIPTION OF THE PREFERRED EMBODIMENTS

Embodiments of the present invention will be concretely described with reference to the drawings.

(First Embodiment)

FIGS. 1 to 6 are referred to explain a portable telephone according to a first embodiment of the present invention.

Figure 1:
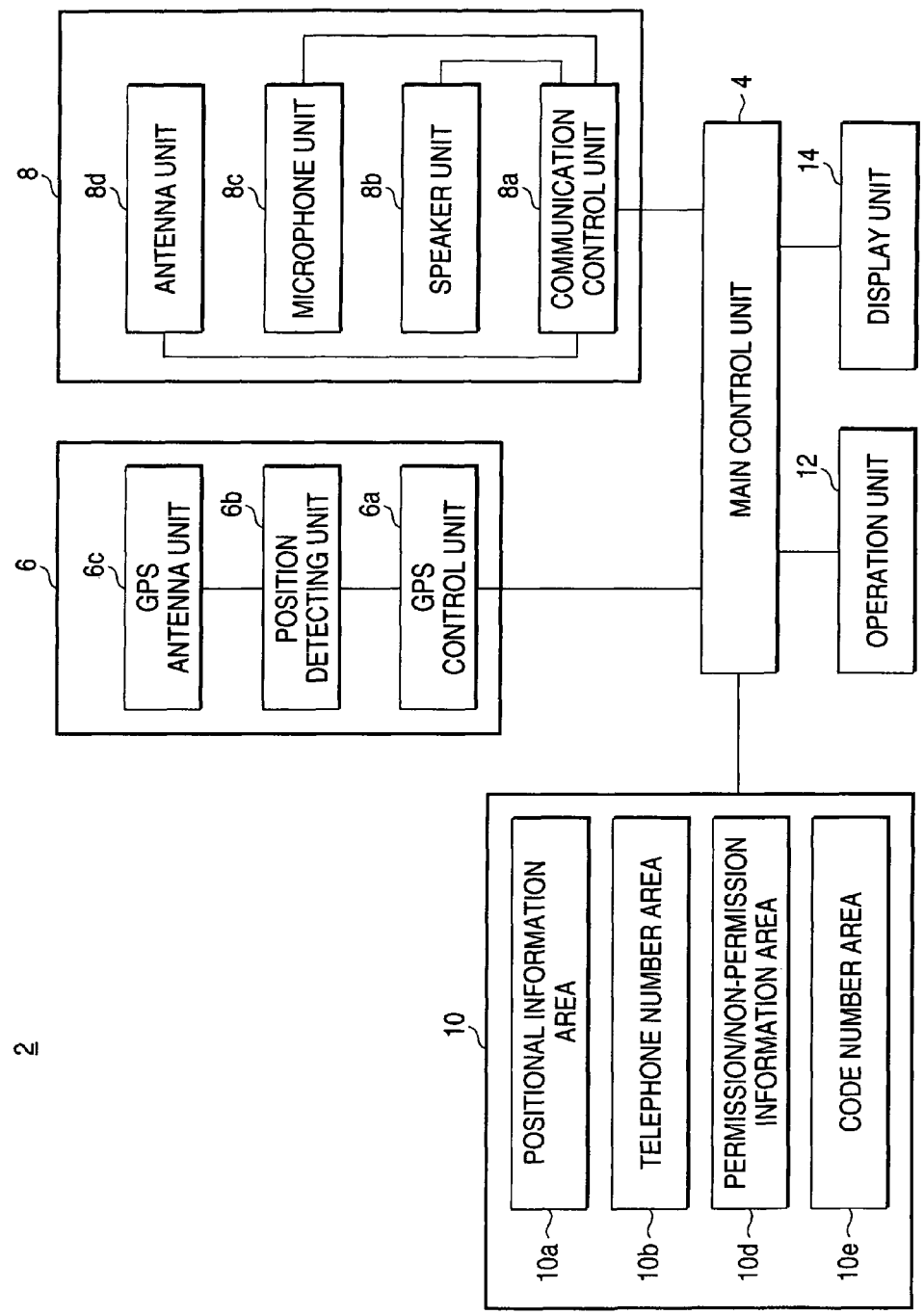
FIG. 1 is a block diagram for showing a circuit configuration of a portable telephone 2 according to a first embodiment of the present invention.

FIG. 1 is a block diagram for showing a portion of a circuit configuration of a portable telephone 2. As shown in FIG. 1, a GPS (Global Positioning System) unit 6, a communication unit 8, a storage unit 10, an operation unit 12, and a display unit 14 such as an LCD (Liquid Crystal Display) are connected to a main control unit 4. The GPS unit 4 functions as a positional information system unit which is employed so as to use a positional information system function. The operation unit 12 is provided with a cursor key and numeric keys.

The GPS unit 6 has a GPS antenna unit 6c, a position detecting unit 6b, and a GPS control unit 6a. The GPS antenna unit 6c receives signals transmitted from GPS satellites. The position detecting unit 6b calculates a present position of the portable telephone 2 based upon the signals received by the GPS antenna unit 6c. The GPS control unit 6a controls the GPS antenna unit 6c and the position detecting unit 6b.

The communication unit 8 has a speaker unit 8b, a microphone unit 8c, an antenna unit 8d, and a communication control unit 8a. Both the speaker unit 8b and the microphone unit 8c are employed so as to perform a telephone communication by way of voice. The antenna unit 8d is used to transmit/receive signals to/from a base station. The communication control unit 8a is used to control the speaker unit 8b, the microphone unit 8c, and the antenna unit 8d. The communication unit 8 can transmit/receive data such as positional information to/from another communication terminal and a base station by way of other signals than voice.

Present positional information (namely, information as to latitude, longitude, and the like) calculated by the position detecting unit 6b of the GPS unit 6 is transmitted by the communication unit 8 via a base station to a center under control of the main control unit 4. In the center, map data about a peripheral area of this present position is generated on the basis of the received positional information. This map data, then, is sent back to the portable telephone 2.

The storage unit 10 has a positional information area 10a, a telephone number area 10b, a permission/non-permission information area 10d, and a code number area 10e. The positional information area 10a is a storage area for storing therein present positional information calculated by the GPS unit 6, and map data received from the center.

The telephone number area 10b is a storage area capable of storing (registering) therein a plurality of telephone numbers, a plurality of names, and the like, which are entered by operating the numeric keys and the like of the operation unit 12, by way of utilizing an address book function owned by this portable telephone 2.

The permission/non-permission information area 10d is a storage area for temporarily storing therein any one of "1(permission)" and "0(non-permission)" as to permission/non-permission information as a judgment result. This judgment result is made as follows. That is, when the portable telephone 2 receives a call, it is judged whether or not a telephone number notified from a calling side is coincident with one of telephone numbers stored in the telephone number area 10b.

As will be explained later, the permission/non-permission information is written in the permission/non-permission information area 10d by the main control unit 4. Further, a user can change the permission/non-permission information by operating the numeric keys and the like of the operation unit 12 so as to perform a predetermined operation during a telephone communication.

The code number area 10e is a storage area for storing therein predetermined code number which has been previously set by the user.

Figure 3:
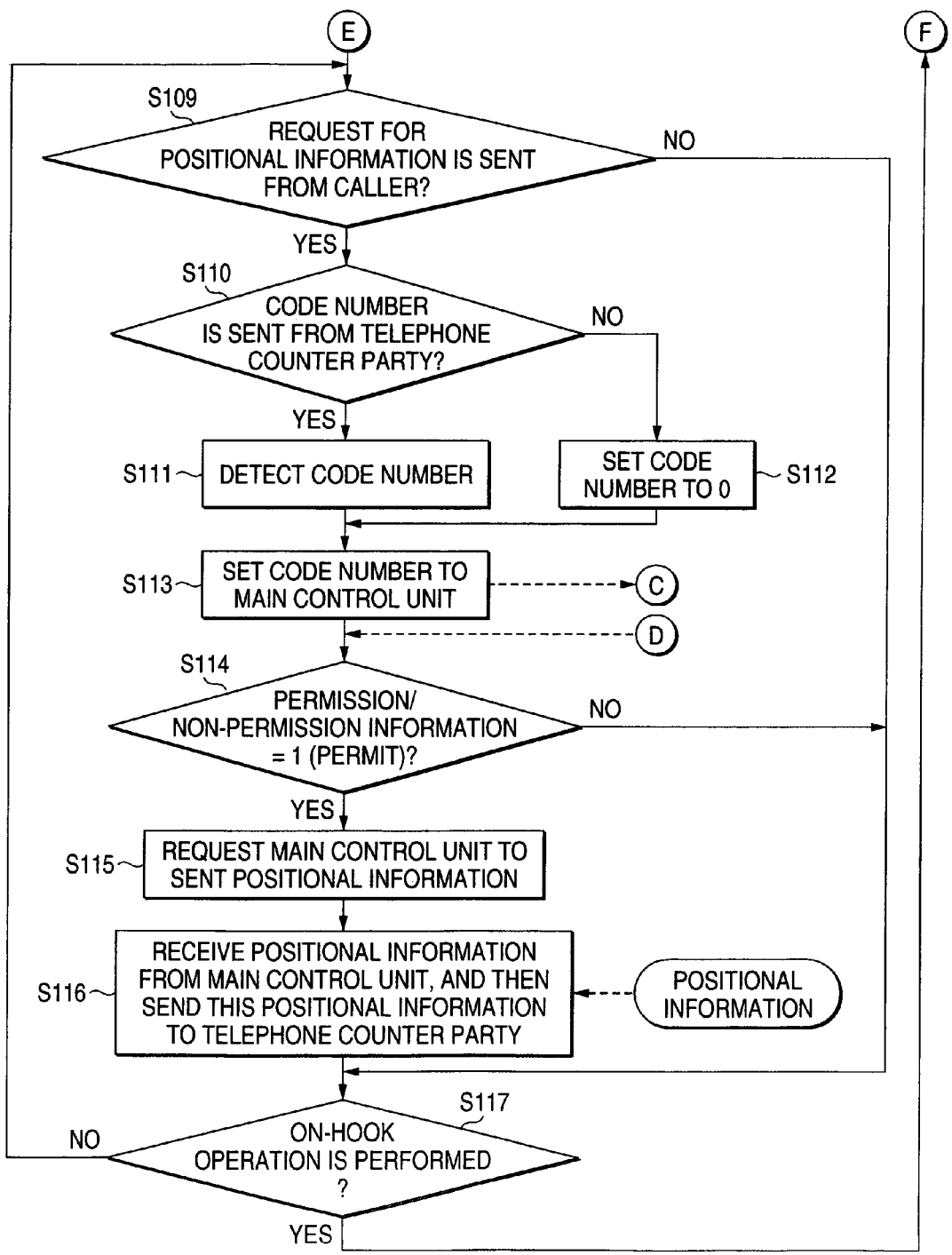
FIG. 3 is a flow chart for describing an operation sequence of the communication unit 8 in the first to third embodiments of the present invention.
Figure 4:
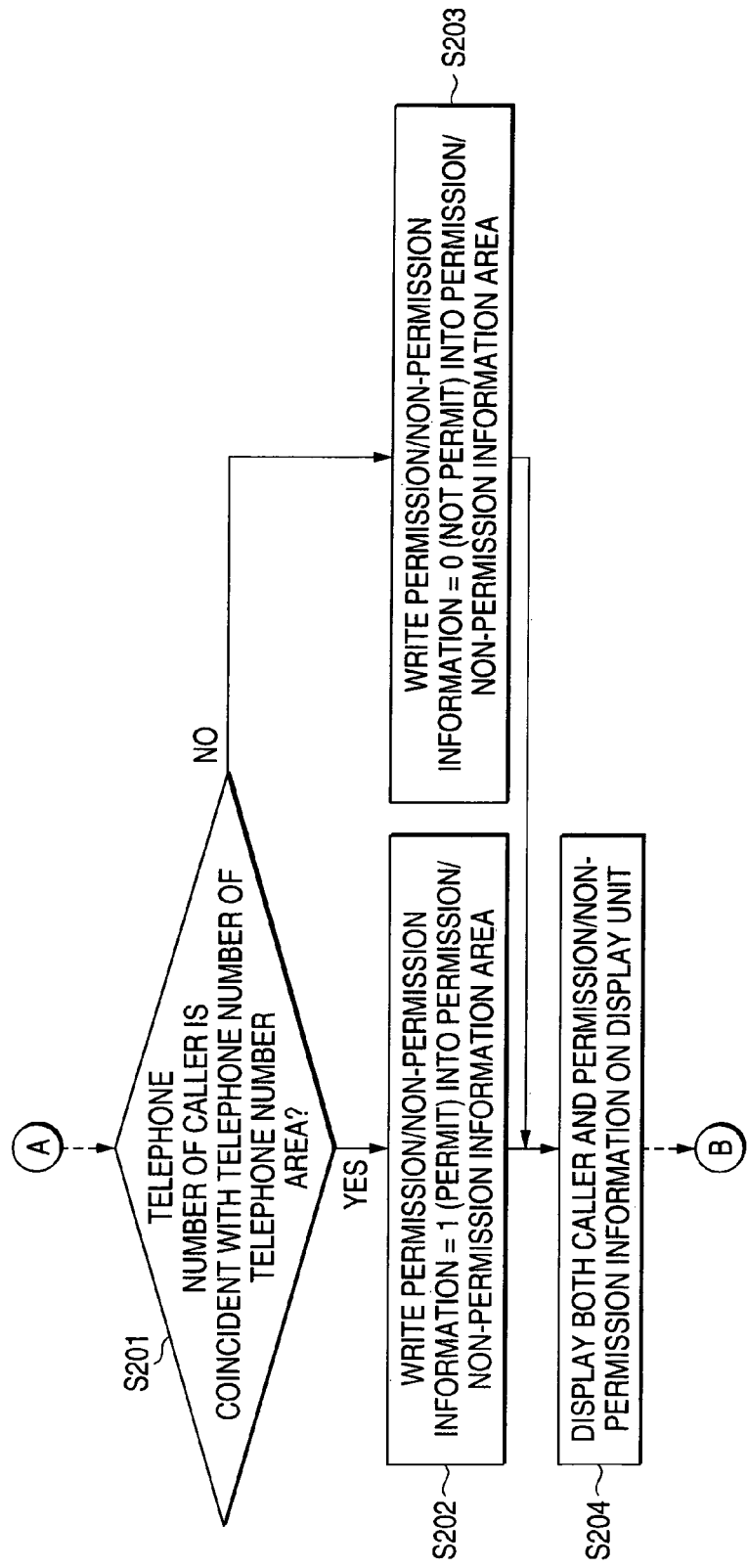
FIG. 4 is a flow chart for describing an operation sequence of a main control unit 4 in the first embodiment of the present invention.
Figure 5:
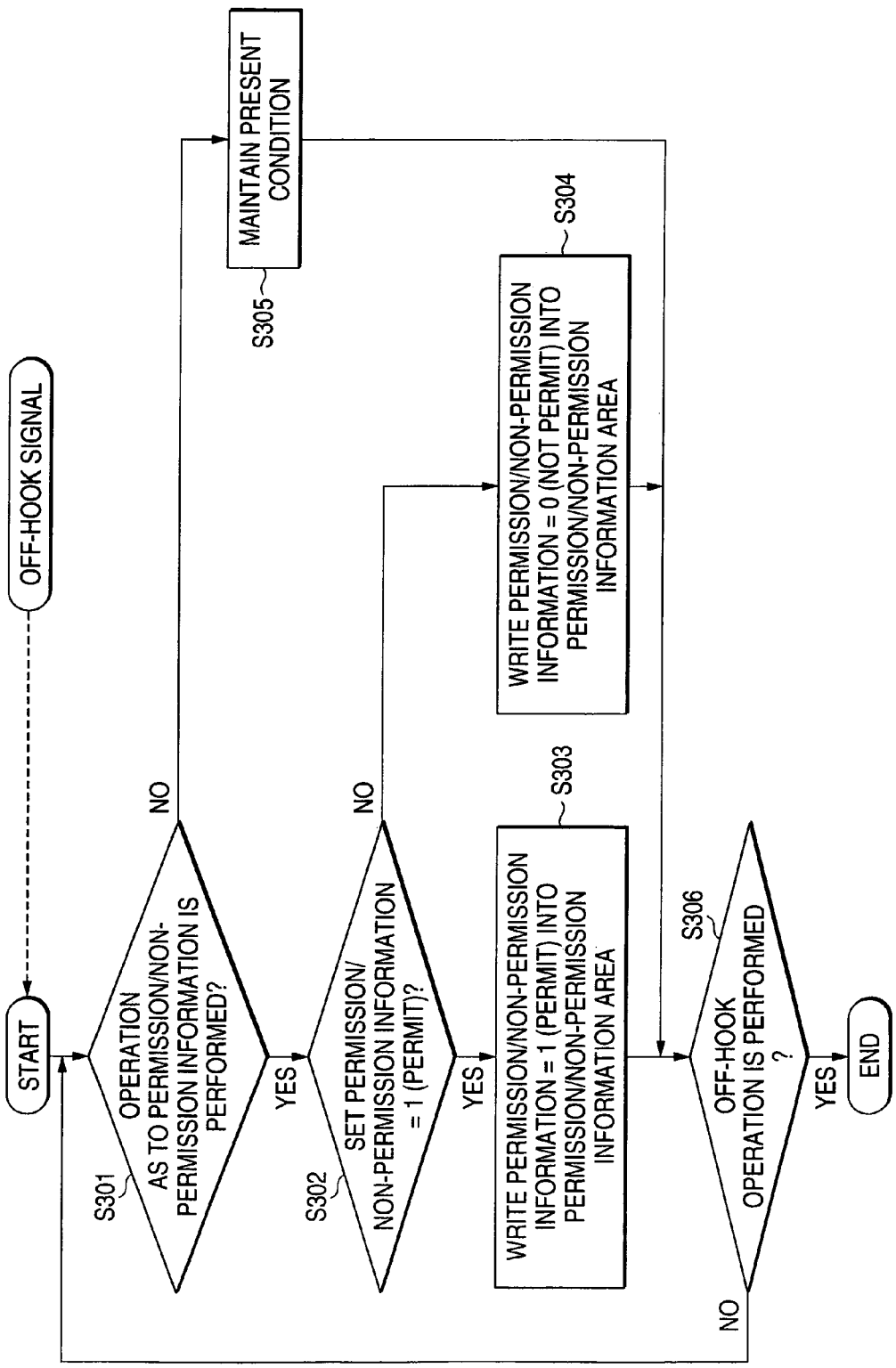
FIG. 5 is a flow chart for describing an operation sequence of the main control unit 4 in the first to third embodiments of the present invention.
Figure 6:
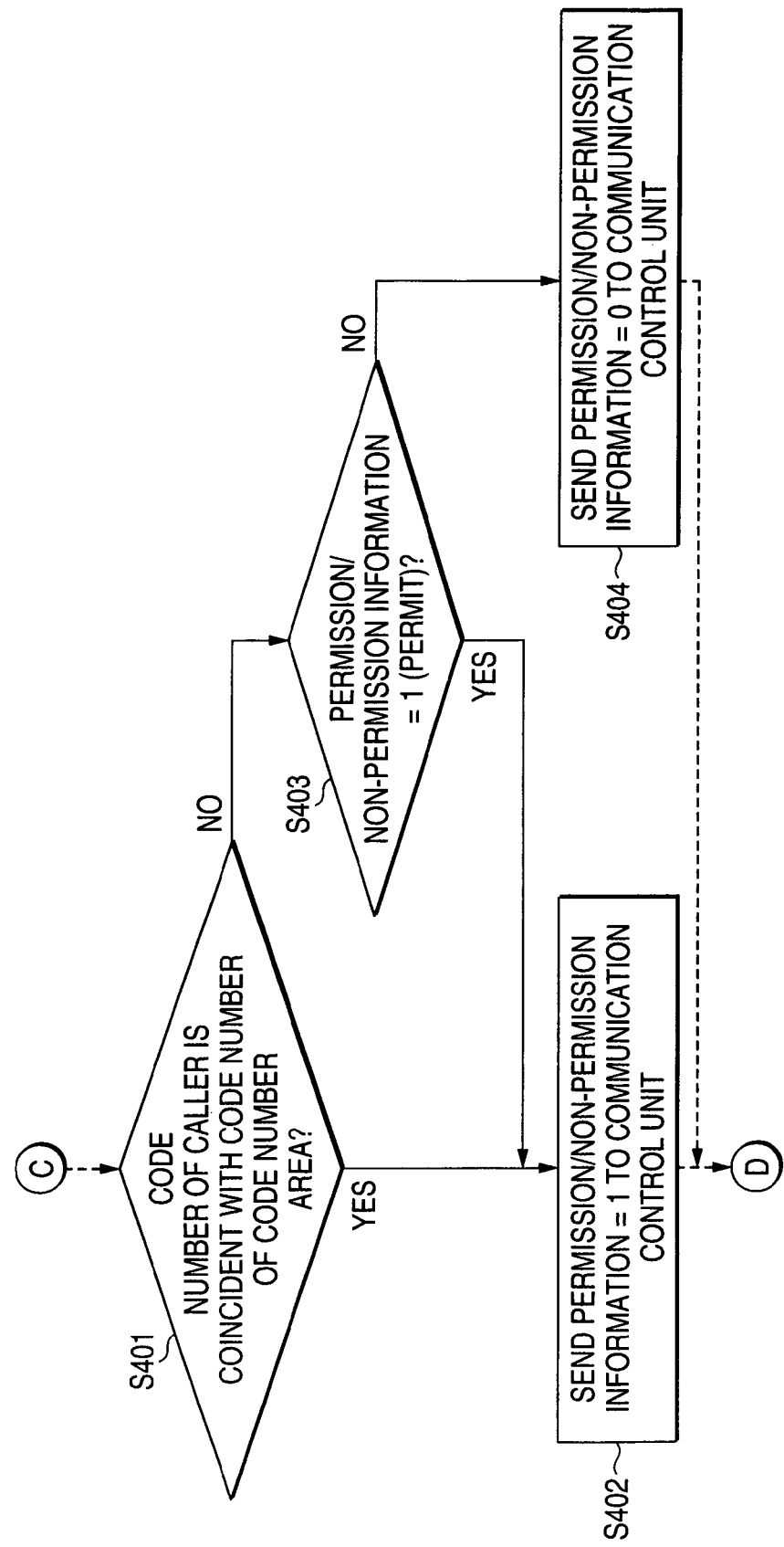
FIG. 6 is a flow chart for describing an operation sequence of the main control unit 4 in the first and second embodiments of the present invention.

Operations of the portable telephone 2 will be explained with reference from FIG. 2 to FIG. 6. Flow charts shown in FIG. 2 and FIG. 3 represent operations of the communication unit 8 in the case that a telephone communication is received, and flow charts shown in FIG. 4 through FIG. 6 represent operations of the main control unit 4.

Figure 2:
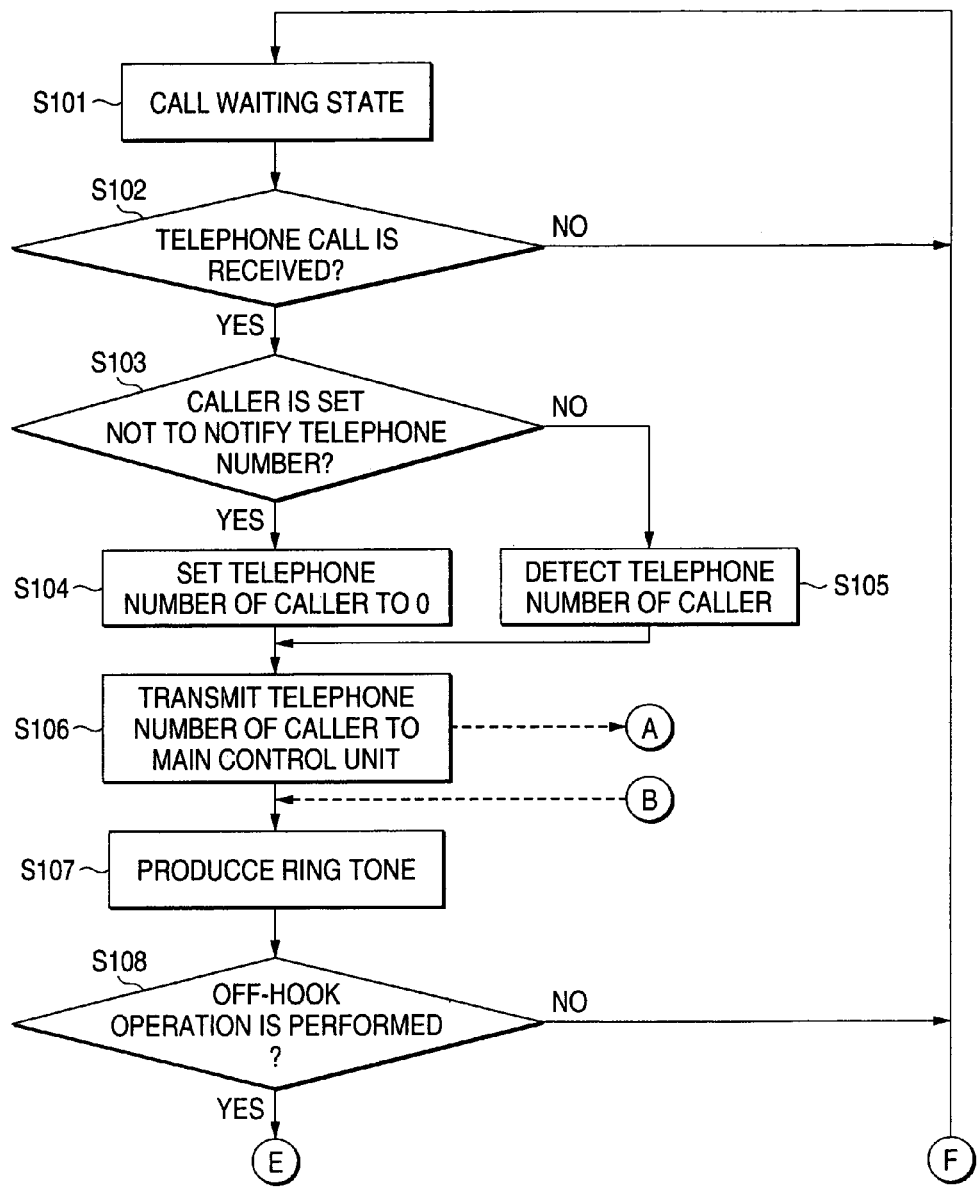
FIG. 2 is a flow chart for describing an operation sequence of a communication unit 8 in the first to third embodiments of the present invention.

As shown in FIG. 2, in the case that a call is received under call waiting condition of the portable telephone 2 (namely, step S101 and "YES" of step S102), the communication control unit 8a judges whether or not a caller sets a notification of the own telephone number to "not notify" (step S103).

In the case that the caller sets the notification setting of the own telephone number on "anonymous" mode ("YES" of step S103), the communication control unit 8a handles the telephone number of the caller as "0" (step S104). In the case that the caller sets the notification setting of the own telephone number on "notification" mode ("NO" of step S103), the communication control unit 8a detects this telephone number (step S105).

Next, the communication control unit 8a transmits the detected telephone number of the caller to the main control unit 4 (indicated by broken arrow line "A" in step S106), and is brought into a call waiting condition until a signal is transmitted from the main control unit 4 (indicated by broken arrow line "B" appeared before step S107).

As shown in FIG. 4, the main control unit 4 receives a telephone number of the caller from the communication control unit 8a (indicated by broken arrow line "A" appeared before step S201), and then, retrieves whether or not the telephone number is stored in the telephone number area 10b of the storage unit 10 (step S201).

In the case that the telephone number of the caller is stored in the telephone number area 10b of the storage unit 10 ("YES" of step S201), the main control unit 4 writes "1(permission)" into the permission/non-permission information area 10d (step S202).

In the case that the telephone number of the caller is not stored in the telephone number area 10b of the storage unit 10, or in the case that the telephone number of the caller is handled as "0" ("NO" in step S201), the main control unit 4 writes "0(non-permission)" into the permission/non-permission information area 10d (step S203).

Then, the main control unit 4 controls to display the content of the permission/non-permission information which was written into the permission/non-permission information area 10d with the telephone number of the caller on the display unit 14 (step S204). For instance, in the case that the telephone number of the caller corresponds to one of telephone numbers stored in the telephone number area 10b of the storage unit 10, the main control unit 4 may display a name and the like with the telephone number of the caller on the display unit 14. Also, in the case that the permission/non-permission information corresponds to "1(permission)", the main control unit 4 may display on the display unit 14, such a guidance as "when positional information is requested to be sent back from the caller, positional information is sent" instead of this permission/non-permission information.

When the main control unit 4 accomplishes the process operations defined up to the process operation of the step S204, the main control unit 4 transmits a signal for releasing the call waiting state of the communication control unit 8a (indicated by broken arrow line "B" after step S204) to the communication control unit 8a.

Next, as shown in FIG. 2, the communication control unit 8a receives the signal for releasing the call waiting state, which is transmitted from the main storage unit 4, at a stage that the process operations defined up to the step S106 have been accomplished (indicated by broken arrow line "B" after step S106).

Then, the communication control unit 8a controls to produce a ringtone from the speaker unit 8b in order to notify the reception of the incoming call to the user (step S107). In this stage, the user views the information displayed on the display unit 14 (see step S204 of FIG. 4), and can judge whether or not the user operates for off-hook.

Also, even under such a condition that the user cannot immediately operates for the off-hook, a telephone answering function is set under normal condition of the portable telephone 2. Thus, the off-hook operation is automatically executed after a predetermined time period has passed since a ringtone starts to sound, so that a message made by a caller may be recorded, or the like.

When the user operates for the off-hook, a signal indicating the off-hook operation is transmitted from the operation unit 12 via the main control unit 4 to the communication control unit 8a, and thus, such a off-hook state under which a conversation can be made is continued ("YES" of step S108 of FIG. 2) until the user operates for on-hook (step S117 of FIG. 3).

Then, when the user does not operates for the off-hook under a condition that the telephone answering function is released ("NO" in step S108), the portable telephone 2 is again brought into a call waiting state after the ringtone is interrupted (step S101).

On the other hand, when the user operates for the off-hook, the main control unit 4 accepts this signal from the operation unit 12. Then, as shown in FIG. 5, the permission/non-permission information stored in the permission/non-permission information area 10d of the storage unit 10 can be changed by executing a predetermined operation by operating the numeric keys and the like of the operation unit 12 (step S301 to step S305) until the main control unit 4 accepts the signal representing that the on-hook operation is performed from the operation unit 12 ("YES" in step S306).

In the case that the user operates to change the permission/non-permission information while a telephone communication is in progress ("YES" in step S301), the main control unit 4 detects this changing operation. Then, in the case that the operation by the user causes the permission/non-permission information to be set to "1(permission)" ("YES" in step S302), the main control unit 4 controls to write the information of "1(permission)" into the permission/non-permission information area 10d of the storage unit 4 (step S303).

In the case that the operation by the user does not cause the permission/non-permission information to be set to "1(permission)" ("NO" in step S302), the main control unit 4 controls to write the information of "0(non-permission)" into the permission/non-permission information area 10d of the storage unit 4 (step S304). Also, in the case that the user does not operate to change the permission/non-permission information ("NO" in step S301), the permission/non-permission information stored in the permission/non-permission information area 10d of the storage unit 10 is kept unchanged (step S305).

Also, as shown in FIG. 3, in the case that the communication control unit 8a does not especially receive a signal for requesting positional information during a telephone communication after the user has operated for the off-hook ("NO" in step S109), the communication control unit 8a continues the control operation only for the voice communication. While a telephone communication is in progress, when the communication control unit 8a detects voice signals and a signal for requesting the positional information which are sent from the caller ("YES" of step S109), the communication control unit 8a executes the below-mentioned operations.

The communication control unit 8a firstly judges whether or not a code number is transmitted with the signal for requesting the positional information from the caller (step S110). When the code number is transmitted, the communication control unit 8a detects this code number (step S111), whereas when the code number is not transmitted, the communication control unit 8a handles that the code number as "0" (step S112).

Then, the communication control unit 8a transmits the detected code number to the main control unit 4 (indicated by broken arrow line "C" of step S113). The process operation by the communication control unit 8a with respect to the request for the positional information is again commenced after the communication control unit 8a receives a signal as to permission/non-permission information from the main control unit 4 (indicated by broken arrow-line "D" appeared before step S114).

As shown in FIG. 6, when the main control unit 4 receives the code number from the communication control unit 8a (indicated by broken arrow line "C"), the main control unit 4 judges whether or not this received code number is coincident with a code number stored in the code number area 10e of the storage unit 10 (step S401).

In the case that the code number received from the communication control unit 8a is coincident with the code number stored in the code number area 10e of the storage unit 10 ("YES" of step S401), the main control unit 4 controls to transmit "1(permission)" as the permission/non-permission information, irrespective of whether or not the permission/non-permission information is "1(permission)" (refer to steps S202 to S203 of FIG. 4, and steps S303 to S304), to the communication control unit 8a (step S402).

In the case that the code number received from the communication control unit 8a is not coincident with the code number stored in the code number area 10e of the storage unit 10 ("NO" of step S401), the main control unit 4 controls to directly transmit the present content of the permission/non-permission information which is stored in the permission/non-permission information area 10d of the storage unit 10 to the communication control unit 8a.

That is to say, in the case that the permission/non-permission information stored in the permission/non-permission information area 10d of the storage unit 10 corresponds to "1(permission)" ("YES" of step S403), the main control unit 4 controls to transmit "1(permission)" as the permission/non-permission information to the communication control unit 8a (step S402).

Meanwhile, in the case that the permission/non-permission information stored in the permission/non-permission information area 10d of the storage unit 10 is not equal to "1(permission)" ("NO" of step S403), the main control unit 4 controls to transmit "0(non-permission)" as the permission/non-permission information to the communication control unit 8a (step S404).

As represented in FIG. 3, the communication control unit 8a receives any one of the permission/non-permission information "1(permission)" and "0(non-permission)" at a stage before the step S114 (indicated by broken arrow line "D"). The communication control unit 8a judges as to whether this received permission/non-permission information corresponds to "1 (permission)", or "0(non-permission)."

In the case that the permission/no-permission information is not equal to "1(permission)" ("NO" of step S114), the communication control unit 8a does not perform a control operation for transmitting positional information to a caller. In the case that the permission/non-permission information is equal to "1(permission)" ("YES" of step S114), the communication control unit 8a requests the main control unit 8a to acquire the positional information from the positional information area 10a of the storage unit 10, and then to send back the acquired positional information to the communication control unit 8a (step S115). Then, after the communication control unit 8a has received the positional information from the main control unit 4, the communication control unit 8a controls to transmit this positional information to the caller with voice signals (step S116).

When the telephone communication is ended and the on-hook operation is executed ("YES" of step S117), a signal indicating this state is transmitted from the operation unit 12 via the main control unit 4 to the communication control unit 8a. As shown in FIG. 5, the main control unit 4 terminates accomplishes a condition where the user can change the permission/non-permission information ("YES" of step S306). Also, shown in FIG. 2 and FIG. 3, the communication unit 8 is again brought into a call waiting state ("YES" of step S117 and step S101).

In accordance with the portable telephone 2 of the first embodiment, in the case that the portable telephone is requested to send the positional information by a caller having the telephone number which is stored in the telephone number area 10b of the storage unit 10, the portable telephone 2 can respond to the request for the positional information. On the other hand, even in the case that the portable telephone is requested to send the positional information by a caller not having the telephone number which is stored in the telephone number area 10b of the storage unit 10, the portable telephone 2 does not respond to the request.

Also, after the portable telephone has received a telephone call from a caller having a telephone number other than the telephone number stored in the telephone number area 10b of the storage unit 10 and has commenced a telephone communication, when the portable telephone is requested to send the positional information, the portable telephone can respond to this request by manipulating a predetermined operation if necessary. Conversely, similarly after the portable telephone has received a telephone call from a caller having a telephone number stored in the telephone number area 10b of the storage unit 10 and has commenced a telephone communication, even when the portable telephone is requested to send the positional information, the portable telephone is capable of not responding to this request by manipulating a predetermined operation.

Also, even in the case that the user lost the portable telephone 2, if the user ends request for the positional information along with a predetermined code number to this lost portable telephone 2, then the user can cause the positional information to be sent from the portable telephone 2 and can find out the own portable telephone 2 even when the user makes a telephone call from a telephone having a telephone number which is not stored in the telephone number area 10b of the storage unit 10.

(Second Embodiment)

FIG. 2, FIG. 3, and FIG. 5 to FIG. 8 are referred to explain a portable telephone 20 according to a second embodiment of the present invention. It should be noted that the same reference numerals shown in the portable telephone 2 according to the first embodiment will be employed as those for denoting the same, or similar structural elements of the portable telephone 20 shown in these drawings, and explanations thereof are omitted.

Figure 7:
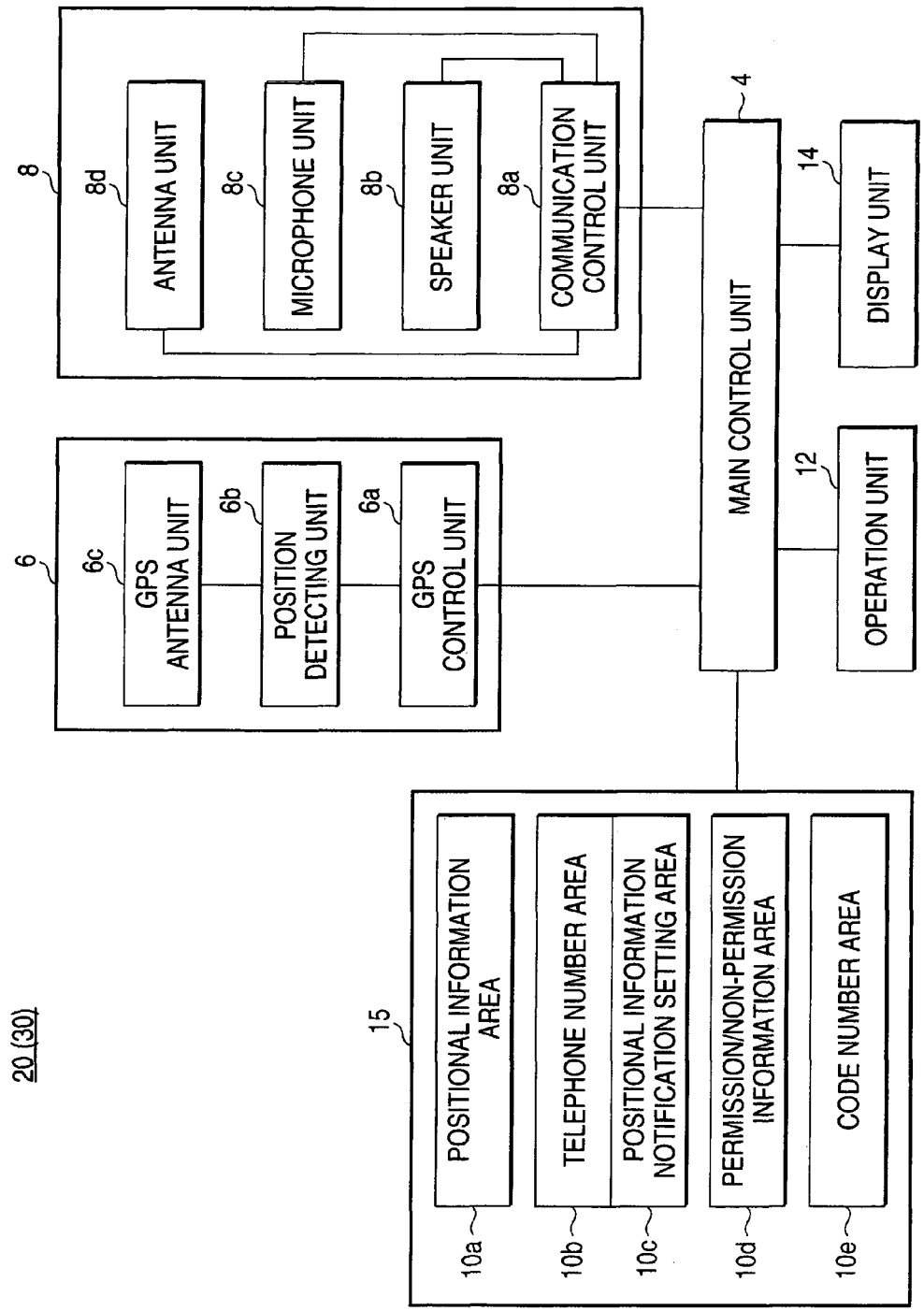
FIG. 7 is a block diagram for indicating a circuit configuration of portable telephones 20 and 30 according to the second and third embodiments of the present invention.

As shown in FIG. 7, a configuration of the portable telephone 20 according to the second embodiment of the present invention are substantially similar to that of the portable telephone 2 according to the first embodiment, as shown in FIG. 1. However, a storage unit 15, which is similar to the storage unit 10 of the first embodiment, in the portable telephone 20 has a positional information notification setting area 10c in addition to the positional information area 10a, the telephone number area 10b, the permission/non-permission information area 10d, and the code number area 10e. The positional information notification setting area 10c is a storage area which is used to store therein positional information notification setting data (permission setting data) assigned to a plurality of telephone numbers stored in the telephone number area 10b.

The positional information notification setting data which is stored in the positional information notification setting area 10c are stored as follows. That is, while an address book function owned in this portable telephone 20 is used, either "ON (permission)" data or "OFF (non-permission)" data is stored in the positional information notification setting area 10c assigned to each of telephone numbers stored in the telephone number area 10b.

While a telephone communication is in progress, when a caller in this communication requests for positional information, in the case that the positional information stored in the positional information area 10a is permitted to be transmitted to the caller, the positional information notification setting data is set to "ON (permission)".

While a telephone communication is in progress, when a caller in this communication requests for positional information, in the case that the request is refused in order not to transmit the positional information to the caller, the positional information notification setting data is set to "OFF (non-permission)".

Next, operations of the portable telephone 20 of the second embodiment will be explained with reference to flow charts shown in FIG. 2, FIG. 3, FIG. 5, FIG. 6 and FIG. 8. It should also be understood that the flow chart of FIG. 8 corresponds to the flow chart of FIG. 4 in the first embodiment, and only a process operation defined in a step S501 of FIG. 8 is different from that of FIG. 4.

In other words, in the second embodiment, after the main control unit 4 receives a telephone number of a caller from the communication control unit 8a (indicated by broken arrow line "A" appeared before step S501), the main control unit 4 retrieves whether or not a telephone number whose positional information notification setting data of the positional information notification setting area 10c of the storage unit 15 is set to "ON (permission)" is coincident with this received telephone number, and is stored in the telephone number area 10b of the storage unit 15 (step S501).

In accordance with the portable telephone 20 of the second embodiment, before the user receives a telephone call, when the request for the positional information is received, the user can set the setting data as to whether or not the request is accepted as the positional information notification setting data by way of the address book function assigned to a plurality of telephone numbers which have been previously stored in the telephone number area 10b.

Also, in the case that a telephone number of a caller corresponds to a telephone number which is stored in the telephone number area 10b of the storage unit 15, and the caller whose positional information notification setting data is set to "ON (permission)" sends request for positional information, the user of the portable telephone 20 can respond to this request. Even when a caller having a telephone number other than the telephone number stored in the telephone number area 10b of the storage unit 15 sends request for positional information, or a caller whose positional information notification setting data is set to "OFF (non-permission)" requests for positional information, the user of the portable telephone 20 is capable of not responding to the request.

After the user has received a telephone call from a caller having a telephone number other than the telephone number stored in the telephone number area 10b of the storage unit 15, or the user has received a telephone call from a caller whose positional information notification setting data is set to "OFF (non-permission)", and then has commenced a telephone communication, when the portable telephone is requested to send the positional information, the user can respond to this request by manipulating a predetermined operation if necessary. Conversely, even after the user has received a telephone call from a caller whose positional information notification setting data is set to "ON (permission)" and has commenced a telephone communication, even when the portable telephone is requested to send the positional information, the user is capable of not responding to this request by manipulating a predetermined operation.

Also, even in the case that the user lost the portable telephone 20, if the user sends request for positional information along with a code number to this lost portable telephone 20, then the user can cause the positional information to be sent from the portable telephone 20 and can find out the own portable telephone 20 even when the user makes a telephone call from a telephone having a telephone number which is not stored in the telephone number area 10$b$ of the storage unit 15, or the user makes a telephone call from a telephone whose positional information notification setting data is set to "OFF (non-permission)".

(Third Embodiment)

FIG. 2, FIG. 3, FIG. 5, FIG. 7, FIG. 8 and FIG. 9 are referred to explain a portable telephone 30 according to a third embodiment of the present invention. It should also be noted that the same reference numerals shown in the portable telephone 20 according to the second embodiment will be employed as those for denoting the same, or similar structural elements of the portable telephone 30 shown in these drawings, and explanations thereof are omitted. As shown in FIG. 7, a configuration of the portable telephone 30 according to the third embodiment is similar to that of the above-described portable telephone 20 according to the second embodiment.

Operations of the portable telephone 30 of the third embodiment will be explained with reference to flow charts shown in FIG. 2, FIG. 3, FIG. 5, FIG. 8, and FIG. 9. It should also be understood that the flow chart of FIG. 9 corresponds to the flow chart of FIG. 6 in the second embodiment, and only a operation process defined in a step S602 of FIG. 9 is different from that of FIG. 6.

In other words, in the third embodiment, in the case that a code number received from the communication control unit 8$a$ is coincident with a code number stored in the code number area 10$e$ of the storage unit 15 ("YES" in step S601), the main control unit 4 changes the positional information notification setting data stored in the positional information notification setting area 10$c$ to "ON (permission)" in correspondence with a telephone number of a caller, which is stored in the telephone number area 10$b$ (step S602). Further, the main control unit 4 transmits the "1(permission)" data as permission/non-permission information to the communication control unit 8$a$ irrespective of whether or not the permission/non-permission information stored in the permission/non-permission information area 10$d$ corresponds to "1(permission)" (step S603).

As another embodiment different from the third embodiment, in the case that a code number which is received along with a request for positional information is coincident with the code number stored in the code number area 10$e$ of the storage unit 15, and also corresponds to a code number which is transmitted from a caller having a telephone number other than the telephone number stored in the telephone number area 10$b$, in the step S602, the main control unit 4 may alternatively store the telephone number of the caller in the telephone number area 10$b$ of the storage unit 15. Furthermore, the main control unit 4 may alternatively set the positional information notification setting data corresponding to the stored telephone number to "ON (permission)", and then may write the "ON (permission)" data in the positional information notification setting area 10$c$.

In accordance with the portable telephone 30 of the third embodiment, before the user receives a telephone call, when the request for positional information is received, the user can set the setting data as to whether or not the request is accepted as the positional information notification setting data by way of the address book function in correspondence with a plurality of telephone numbers which have been previously stored in the telephone number area 10$b$.

Also, in the case that a telephone number of a caller corresponds to a telephone number which is stored in the telephone number area 10$b$ of the storage unit 15, and the caller whose positional information notification setting data is set to "ON (permission)" sends request for positional information, the user of the portable telephone 30 can respond to this request. Even when a caller having a telephone number other than the telephone number stored in the telephone number area 10$b$ of the storage unit 15 sends request for positional information, or a caller whose positional information notification setting data is set to "OFF (non-permission)" sends request for positional information, the user of the portable telephone 30 is capable of not responding to the sending request.

After the user has received a telephone call from a caller having a telephone number other than the telephone number stored in the telephone number area 10$b$ of the storage unit 15, or the user has received a telephone call from a caller whose positional information notification setting data is set to "OFF (non-permission)", and then has commenced a telephone communication, when the portable telephone is requested to send the positional information, the user can respond to this request by manipulating a predetermined operation if necessary. Conversely, even after the user has received a telephone call from a caller whose positional information notification setting data is set to "ON (permission)" and has commenced a telephone communication, even when the portable telephone is requested to send the positional information, the user is capable of not responding to this request by manipulating a predetermined operation.

Also, even in the case that the user lost the portable telephone 30, if the user sends request for positional information and also sends a code number stored in the code number area 10$e$ of the storage unit 15 to this portable telephone 30, then the user can find out the lost portable telephone 30 by changing the positional information notification setting data to the "ON (permission)" data and also by sending the positional information even when the user makes a telephone call from a telephone whose positional information notification setting data is set to "OFF (non-permission)".

In the above-described first to third embodiments, since a predetermined operation is performed by operating numeric keys and the like in the operation unit 12, the permission/non-permission information stored in the permission/non-permission information area 10$d$ of the storage unit 15 can be changed. In addition to the numeric keys and the like, an abbreviated key for changing permission/non-permission information may be alternatively provided on the operation unit 12, and the positional information notification setting data may be alternatively changed by operating the abbreviated key.

In the above-explained first to third embodiments, the positional information system function of the GPS system provided in the portable telephone itself can be utilized. Alternatively, as another embodiment, a positional information system function may be utilized, which uses a function of a system in which a center recognizes positional information of a portable telephone based upon positions of a plurality of base stations capable of communicating this portable telephone, and also generates map data about a peripheral are around the portable telephone. In this alternative case, in response to a request send from a portable telephone, both positional information and map data around the portable telephone may be sent from the center via a base station so as to be stored in a positional information area of a storage unit.

In the above-described first to third embodiments, only the positional information is transmitted in response to the request for positional information sent from a caller. Alternatively, map data may be transmitted along with the positional information.

Further, in the above-described first to third embodiments, the portable telephones have been explained. Instead of the portable telephones, other sorts of portable terminal apparatus such as a PDA (Personal Digital Assistant) may be alternatively employed, in the scope of the present invention, as long as such portable terminal apparatus are capable of utilizing the positional information system function and also capable of being equipped with a function by which voice signals are transmitted/received so as to establish a telephone communication. As a consequence, it is obvious that the portable telephones according to the present invention may also involve other sorts of portable terminal apparatus equipped with the function for transmitting/receiving the voice signal so as to establish the telephone communication, along with the positional information system function can be utilized.

It is so assumed that a telephone communication of the present invention implies that information is transmitted/received mutually between apparatuses, and further, a case in which data is transmitted/received also corresponds to the above-described telephone communication of the present invention.

As previously explained, in accordance with the portable telephone of the present invention, in the case that the portable telephone is requested to send the positional information by a caller having the telephone number stored in the storage unit, or a caller who is set allowed to acquire positional information when the portable telephone is requested to send the positional information, the portable telephones can respond to this sending request, and further, are capable of not responding to the request even when it is requested to send positional information by other callers than the above-described telephone counter parties.

Also, after the telephone communication has been commenced, when a portable telephone is requested to send the positional information, the condition of the portable telephone may be changed to either the respondable condition or the non-respondable condition by executing a predetermined operation, if necessary.

Also, even in the case that the user lost the portable telephone, if the user sends request for positional information along with a code number to the portable telephone, then the user can cause the positional information to be sent from the portable telephone and can find out the own portable telephone even when the user makes a telephone call from a telephone having a telephone number which is not stored in the storage unit, or even when the user makes a telephone call from a telephone is not set allowed to acquire positional information when the portable telephone is requested to send the positional information.

As a consequence, not only a positional information system function can be sufficiently utilized, but also when a telephone call made by an ill-intentioned caller is received and thus a telephone communication is commenced for the caller's purpose, privacy of the user can be firmly protected because the ill-intentioned caller cannot freely make the portable telephone send the positional information.

What is claimed is:

1. A portable communication terminal comprising:
   a present position identifying unit for identifying a present position of said terminal;
   a communication unit for receiving a present position request signal which requests from said terminal a present position information representing said present position, and transmitting said present position information in reply thereto;
   a control unit for judging whether or not another terminal meets a predetermined condition, and controlling said communication unit to transmit said present position information if said predetermined condition is met when said communication unit receives said present position request signal which is transmitted from another terminal,
   wherein said control unit controls not to transmit said present position information to said another terminal in a condition where telephone number of said another terminal is not detected and
   a storage unit for storing a predetermined code number,
   wherein said control unit controls to transmit said present position information to said another terminal in a condition where a code number transmitted from said another terminal is coincident with said predetermined code number even though a telephone number of said another terminal is not detected.

2. A portable communication terminal comprising:
   a present position identifying unit for identifying a present position of said terminal;
   a communication unit for receiving a present position request signal which requests from said terminal a present position information representing said present position, and transmitting said present position information in reply thereto;
   a control unit for judging whether or not another terminal meets a predetermined condition, and controlling said communication unit to transmit said present position information if said predetermined condition is met when said communication unit receives said present position request signal which is transmitted from another terminal
   a storage unit for storing telephone numbers, wherein said control unit controls to transmit the present position information to said another terminal in a condition where a telephone number of said another terminal is stored in said storage unit and wherein said storage unit stores a predetermined code number; and
   said control unit controls to transmit said present position information to said another terminal in a condition where a code number transmitted from said another terminal is coincident with said predetermined code number even though a telephone number of said another terminal is not stored in said storage unit.

3. The portable communication terminal according to claim 2, further comprising:
   a storage unit for storing a plurality of telephone numbers and supplementary information assigned to each telephone number,
   wherein said control unit controls to transmit said present position information to said another terminal in a condition where a telephone number of said another terminal is stored in said storage unit and a supplementary information of the telephone number of said another terminal represents permission to transmit said present position information.

4. The portable communication terminal according to claim 3, wherein said control unit controls to change said supplementary information stored in said storage unit according to predetermined operation made with said operation unit during telephone communication.

5. The portable communication terminal according to claim 2, further comprising:
a display unit for displaying a message,
wherein said control unit controls to display on said display unit a message meaning said terminal transmits the present position information to said another terminal when said communication unit receives the present position request signal, in a condition where a telephone number of said another terminal is stored in said storage unit.

6. The portable communication terminal according to claim 2, further comprising:
an operation unit for adding, changing or deleting information stored in said storage unit,
wherein said control unit controls to register a telephone number into said storage unit according to predetermined operation made with said operation unit.

7. A portable communication terminal comprising:
a present position identifying unit for identifying a present position of said terminal;
a communication unit for receiving a present position request signal which requests from said terminal a present position information representing said present position, and transmitting said present position information in reply thereto;
a control unit for judging whether or not another terminal meets a predetermined condition, and controlling said communication unit to transmit said present position information if said predetermined condition is met when said communication unit receives said present position request signal which is transmitted from another terminal, wherein the control unit judges whether or not said another terminal meets the predetermined condition based on notification of a telephone number from said another terminal; and
a storage section which stores a predetermined code number, wherein the control unit controls the communication unit to transmit the present position information if a code number being transmitted from said another terminal is coincident with the predetermined code number, even when the telephone number is not notified of by said another terminal.

8. The portable communication terminal according to claim 7, wherein the control unit performs a control so that the present position information is not transmitted to said another terminal when the telephone number is not notified of by said another terminal.

9. The portable communication terminal according to claim 7, further comprising:
a storage section which stores the telephone number,
wherein the control unit controls the communication unit to transmit the present position information when the telephone number of said another terminal being notified of by said another terminal is stored in the storage section.

10. The portable communication terminal according to claim 7, further comprising;
a storage section which stores the telephone number
and permission information indicating whether or not transmission of the present position information is permitted, the permission information being unique to the telephone number,
wherein the control unit controls the communication unit to transmit the present position information when the telephone number of said another terminal being notified of by said another terminal is stored in the storage section and when the permission information of the telephone number of said another terminal permits the transmission of the present position information.

11. The portable communication terminal according to claim 7, further comprising:
a storage section which stores the telephone number and a predetermined code number,
wherein the control unit controls the communication unit to transmit the present position information if a code number being transmitted from said another terminal is coincident with the predetermined code number, even when the telephone number of said another terminal being notified of by said another terminal is not stored in the storage section.

12. The portable communication terminal according to claim 7, further comprising:
a storage section which stores the telephone number, permission information indicating whether or not transmission of the present position information is permitted, the permission information being unique to the telephone number, and a predetermined code number,
wherein the control unit controls the communication unit to transmit the present position information if a code number being transmitted from said another terminal is coincident with the predetermined code number, when the telephone number of said another terminal being notified of by said another terminal is stored in the storage section but the permission information of the telephone number of said another terminal does not permit the transmission of the present position information.

* * * * *